Dec. 4, 1945. J. D. LANGDON 2,390,108

COMBINED CHECK VALVE AND VACUUM BREAKER

Original Filed Oct. 16, 1941

INVENTOR
Jesse D. Langdon
BY Henry J. Lucke
HIS ATTORNEY

Patented Dec. 4, 1945

2,390,108

UNITED STATES PATENT OFFICE 2,390,108

COMBINED CHECK VALVE AND VACUUM BREAKER

Jesse D. Langdon, Long Beach, Calif.

Original application October 16, 1941, Serial No. 415,165, now Patent No. 2,336,486, dated December 14, 1943. Divided and this application May 6, 1943, Serial No. 485,839½

10 Claims. (Cl. 137—69)

This invention relates to improvements in check valves, and has particular value as applied to vacuum breakers designed to prevent back-flow in plumbing systems.

An object of my invention is to provide an improved vacuum breaker in which an apertured tube, serving conjointly as a valve chamber and tail piece, is coupled to a water supply pipe, and a unitary check valve is removably positioned within said apertured tube in proper operative relation therewith, by the coupling means connecting the supply pipe and tail piece.

An object of the invention is to provide means whereby a very tight closure of a check valve is possible by the application of relatively small force.

Another object is to provide an improved check valve unit in combination with an apertured tubular casing coupled to a water supply pipe to serve as a tail piece therefor, to provide a syphon breaker, or back-pressure control device, of low first cost, ease of replacement or repair, and high operative efficiency.

An additional object is to provide a construction of syphon breaker, or back-pressure control device, such that the check valve means thereof is positively effective to both control the flow of liquid therethrough and to open and to tightly close the air vents thereof.

Further objects and features will be apparent from the following detailed description of the specific embodiment illustrated in the accompanying drawing.

This application is a division of my copending application, Serial No. 415,165, filed October 16, 1941, now Patent No. 2,336,486, granted December 14, 1943.

Figure 1:
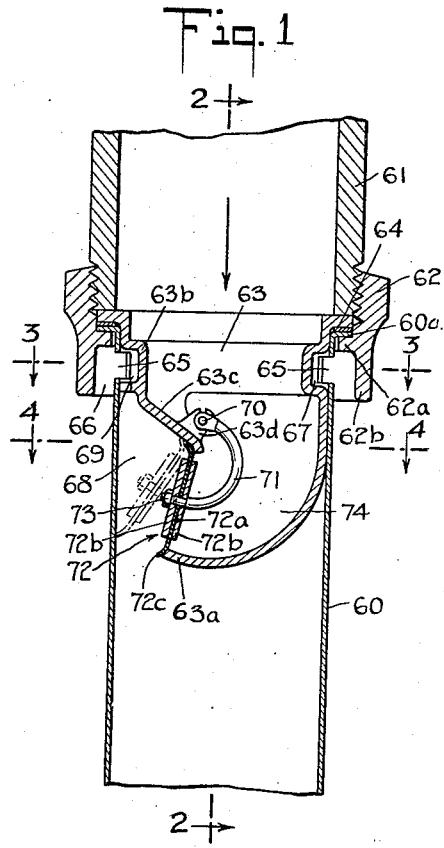
Fig. 1 is a vertical section through a preferred form of the invention, and showing the two-fold function of the check valve element thereof.
Figure 2:
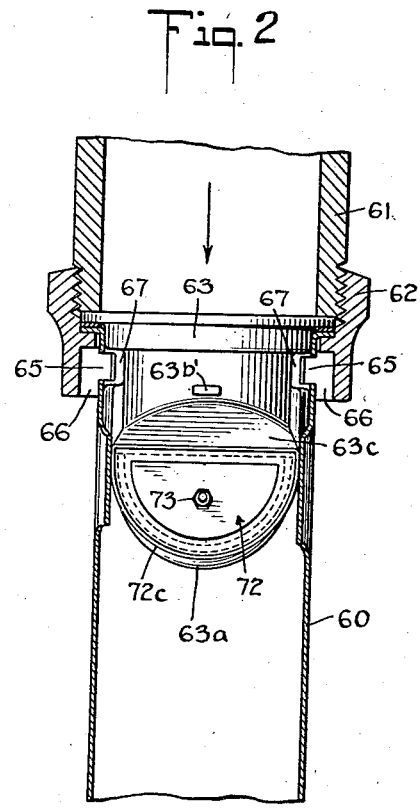
Fig. 2 is a vertical section taken approximately on the line 2—2, Fig. 1, and illustrating internal parts in elevation.

A preferred embodiment of my invention includes a double acting, single flap valve for accomplishnig, in a simple tubular valve casing, the double objective of check valve and air control device.

The valve casing is here formed by a conventional tail piece 60 secured to the discharge end of supply piping 61 by means of a coupling nut 62, the tail piece being provided, at its upper end, with an outwardly extending flange 60a, which rests upon an internally extending circumferential shoulder 62a of the coupling nut 62 and is clamped in place by tightening the coupling nut relative to the discharge end of the supply piping.

A tubular insert element 63 is suspended within the valve casing, the outwardly extending circumferential flange 64 thereof resting upon the flange 60a of the tail piece, and being clamped therewith between the discharge end of supply piping 61 and internally extending shoulder 62a of the coupling nut. Thus, such tubular insert element is securely held within the valve casing with its body disposed within tail piece 60.

The tubular insert element 63 curves at its lower end so as to locate and direct its discharge end 63a, and the discharge orifice defined thereby substantially laterally within the valve casing.

A plurality of air ports or vents 65 are aligned circumferentially at the upper end of tail piece 60, and coupling nut 62 has a depending circumferential flange 62b, forming a protective apron around such air ports or vents as well as a circumferential air inlet 66 to allow inflow of air into the valve casing when necessary.

Tubular insert element 63 is circular at its upper end and is dimensioned to fit snugly within the upper end of tail piece 60, thus centering itself within the valve casing. Adjacent its upper end, it is provided with inwardly extending, channel-defining walls, indicated generally 63b, which, together with tail piece 60 form an annular air passage 67 at the location of and comprehending the air ports or vents 65. The lower portion of tubular insert element 63 is reduced in cross-sectional area by a transversely extending wall 63c, which, at its lower end, aids in defining the discharge end 63a, and the thereby defined outflow orifice.

Figure 4:
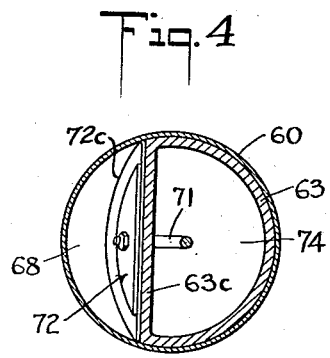
Fig. 4 is a horizontal section taken on the line 4—4, Fig. 1.

It should be noted that the lower portion of tubular insert element 63 fits snugly against only a portion of the circumference of the inner wall face of tail piece 60, and defines therewith a flow passage 68, externally of itself, which is disposed laterally in the valve casing between the orifice defined by discharge end 63a of the insert element and a portion of the inner wall face of tail piece 60, such flow passage 68 constituting, in effect, a segment of the circular horizontal sectional area of the tail piece 60, see Fig. 4.

Figure 3:
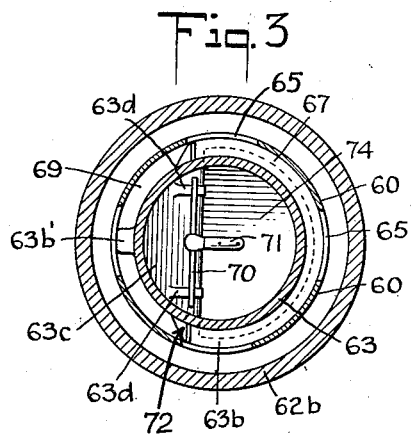
Fig. 3 is a horizontal section taken on the line 3—3, Fig. 1.

The bottom portion of the channel-defining walls 63b is not coextensive with the top portion thereof, but falls short of the segment overlying the discharge end 63a, see 69, thereby providing communication of flow passage 68 with the circumferential air inlet 66. A stud 63b', see Fig. 3, is, however, provided as a spacer in the positioning of tubular insert element 63 within the valve casing.

Upstanding studs 63d and 63d are provided on the upper surface of transverse wall 63c, and are notched to receive and pivot the spindle 70, of curved arm 71. Such curved arm 71 carries, at its lower end, the flap valve 72.

The flap valve 72 is preferably formed by a properly configured sheet of flexible resilient material 72a, such as rubber, sandwiched between similarly configurated but smaller washers 72b and 72b. As thus built up, flap valve 72 is secured at the lower end of arm 71, as by means of a nut 73, and has a yieldable lip 72c preferably of resilient material and provided by the peripherally overlapping part of sheet 72a.

The discharge end 63a of tubular insert element 63 forms a valve seat, surrounding the discharge orifice, against which the sealing lip 72c of the flap valve normally seats under the influence of gravity acting on the flap valve.

When liquid flows through the supply piping 61, as indicated by the appended arrow, down through flow passage 74 of the tubular insert element 63, the flap valve 72 is forced from the seat 63a and into a new seating position against the opposite inner wall face of tail piece 60 and against the lower surface of transverse wall 63c of the tubular insert element, thus closing off flow passage 68 against outflow or spurting of liquid through the air ports or vents 65. Backflow from tail piece 60 toward supply piping 61 will, if it takes place at all, be stopped by flap valve 72 resting in its normal seating position across the discharge orifice of the tubular insert element 63. In case of suction in supply piping 61, resulting in tight closure of the flap valve in its aforesaid normal seating position, the air ports or vents 65 are open to admit air through flow passage 68, and, thus, dissipate any vacuum within the tail piece 60 in the event there should be any failure of the flap check valve 72.

It should be noted that the tubular insert element can be easily removed, as a unit, from the casing structure, and the flap valve element 72 can be lifted from the open ended slots of 63d, 63d, comprising its pivotal mounting and removed, for replacement of parts, if necessary.

Whereas, this invention is illustrated and described with reference to preferred specific embodiments thereof, it should be understood that various changes may be made in such specific embodiments, and many other embodiments may be constructed, by those skilled in the art without departing from the spirit and generic scope of the invention as set forth herein and in the claims that here follow.

I claim:

1. In combination, a tubular casing having a flange at one end and having vents adjacent said end, and a unitary check valve disposed within said tubular casing and removably supported therein by engagement with said casing flange; said check valve having at its outlet a pivotally mounted valve element including a rim portion engageable with the side wall of said casing between the outlet and the vents to preclude accidental discharge of fluid from said check valve through said vents.

2. In combination, a tubular casing having vents communicating with the atmosphere, said casing having a flange at one end, and a unitary check valve disposed within said tubular casing and removably supported therein by engagement with said casing flange; said check valve having at its outlet a pivotally mounted valve element including a flexible rim portion engageable with the side wall of said casing between the outlet and the vents to preclude accidental discharge of fluid from said check valve through said vents.

3. In combination, a tubular casing having vents communicating with the temperature, a unitary check valve removably disposed within said tubular casing and having a discharge opening directed toward a side wall of said casing at a level beneath said vents, and a pivotally mounted flap disposed between said discharge opening and said casing wall, said flap valve having a periphery adapted normally to seat against said check valve outlet and swingable upon fluid discharge through said check valve to seat against the wall of said casing below the vents thereof while providing a baffle for directing the discharge from said check valve downwardly into said tubular casing.

4. In combination, a tubular casing having vents communicating with the atmosphere, a unitary check valve removably disposed within said tubular casing and having a discharge opening directed toward a side wall of said casing at a level beneath said vents, and a pivotally mounted flap disposed between said discharge opening and said casing wall, said flap valve having a flexible periphery adapted normally to seat against said check valve outlet and swingable upon fluid discharge through said check valve to seat against the wall of said casing below the vents thereof while providing a baffle for directing the discharge from said check valve downwardly into said tubular casing.

5. A vacuum breaking check valve device, comprising a tail piece, supply piping, and a coupling nut securing said tail piece to the discharge end of said supply piping and forming, therewith, a tubular casing having an inlet and an outlet; a tubular insert secured between said tail piece and said supply piping, said tubular insert element having channel-defining wall portions adjacent its upper end, which, together with the said tail piece, form an annular air flow passage, and having, further, lower wall portions formed to define a downwardly directed flow passage and to terminate in a peripheral discharge lip which defines a discharge orifice directed substantially laterally within said tail piece; ports formed through the wall of said tail piece at the location of said annular air flow passage; a circumferential air inlet defined by said coupling nut about the upper portion of said tail piece and communicating with said annular air flow passage through said ports; passage means between said annular air flow passage and the interior of said tail piece adjacent the discharge orifice of said tubular insert element; and a flap valve suspended within said tubular insert element for pivotal movement, said flap valve having a seating edge configurated to conform with the inner surface of said tail piece and which normally seats under the influence of gravity against the said peripheral discharge lip of said tubular insert element and closes off said discharge orifice, said flap valve being adapted to swing, under the influence of flow, downwardly through said flow passage, so that its said seating edge seats against that portion of the wall of said tail piece which lies substantially directly opposite from said discharge orifice for closing said passage means.

6. A vacuum breaking check valve device, comprising a tail piece, supply piping, and a coupling nut securing said tail piece to the discharge end of said supply piping and forming, therewith, a tubular casing having an inlet and an outlet; a tubular insert element secured between said tail piece and said supply piping by means of said coupling nut, said tubular insert element having channel-defining wall portions adjacent its upper end, which, together with the said tail piece, form an annular air flow passage, and having, further, lower wall portions formed to define a downwardly directed flow passage and to terminate in a peripheral discharge lip which defines a discharge orifice directed substantially laterally within said tail piece; ports formed through the wall of said tail piece at the location of said annular air flow passage; a circumferential air inlet defined by said coupling nut about the upper portion of said tail piece and communicating with said annular air flow passage through said ports; passage means between said annular air flow passage and the interior of said tail piece adjacent the discharge orifice of said tubular insert element; and a flap valve suspended within said tubular insert element for pivotal movement, said flap valve having a flexible resilient outwardly and peripherally extending sealing lip which normally seats under the influence of gravity against the said peripheral discharge lip of said tubular insert element and closes off said discharge orifice, said flap valve being adapted to swing, under the influence of flow downwardly through said flow passage, so that its said sealing lip seats against that portion of the wall of said tail piece which lies substantially directly opposite from said discharge orifice for closing said passage means.

7. A vacuum breaking check valve device in combination with supply piping, said vacuum breaking check valve device comprising a tail piece; coupling means securing said tail piece relative to the discharge end of the supply piping; a tubular insert element secured by the said tail piece adjacent the discharge end of the supply piping, said tubular insert element having channel-defining wall portions adjacent its upper end which with said tail piece form an air flow passage, said tubular insert element having further lower wall portions formed to define a liquid flow passage from the supply piping toward said tail piece and terminating in a discharge opening the plane of which extends at an angle to the general direction of liquid flow from the supply piping toward said tail piece; air vents formed through the wall of said tail piece communicating with said air flow passage; a flap valve closure for said discharge opening; and means for displaceably mounting said flap valve closure to close said discharge opening under gravity in the absence of liquid flow and for displacing said flap valve closure relative to said discharge opening under liquid flow through said liquid flow passage, said flap valve closure comprising yieldable material arranged to engage and seal said discharge opening when in closed position, said yieldable material being configurated to engage a wall of said tail piece intermediate the discharge opening of said tail piece and said air vents to close communication of the lower interior portion of said tail piece with respect to said air vents.

8. A vacuum breaking check valve device in combination with supply piping, said vacuum breaking check valve device comprising a tail piece; coupling means securing said tail piece relative to the discharge end of the supply piping; a tubular insert element secured by the said tail piece adjacent the discharge end of the supply piping, said tubular insert element having channel-defining wall portions adjacent its upper end which with said tail piece form an annular air flow passage, said tubular insert element having further lower wall portions formed to define a liquid flow passage from the supply piping toward said tail piece and terminating in a discharge opening the plane of which extends at an angle to the general direction of liquid flow from the supply piping toward said tail piece; air vents formed through the wall of said tail piece communicating with said annular air flow passage; a flap valve closure for said discharge opening; and means for displaceably mounting said flap valve closure to close said discharge opening under gravity in the absence of liquid flow and for displacing said flap valve closure relative to said discharge opening under liquid flow through said liquid flow passage, said flap valve closure comprising yieldable material arranged to engage and seal said discharge opening when in closed position, said yieldable material being configurated to engage a wall of said tail piece intermediate the discharge opening of said tail piece and said air vents to close communication of the lower interior portion of said tail piece with respect to said air vents.

9. A vacuum breaking check valve device in combination with supply piping, said vacuum breaking check valve device comprising a tail piece; coupling means securing said tail piece relative to the discharge end of the supply piping; a tubular insert element secured by the said tail piece adjacent the discharge end of the supply piping, said tubular insert element having channel-defining wall portions adjacent its upper end which with said tail piece form an air flow passage, said tubular insert element having further lower wall portions formed to define a liquid flow passage from the supply piping toward said tail piece and terminating in a discharge opening of segmental circular formation the plane of which extends at an angle to the general direction of liquid flow from the supply piping toward said tail piece; air vents formed through the wall of said tail piece communicating with said air flow passage; a flap valve closure of segmental circular formation for said discharge opening; and means for displaceably mounting said flap valve closure to close said discharge opening under gravity in the absence of liquid flow and for displacing said flap valve closure relative to said discharge opening under liquid flow through said liquid flow passage, said flap valve closure comprising yieldable material arranged to engage and seal said discharge opening when in closed position, said yieldable material being configurated to engage a wall of said tail piece intermediate the discharge opening of said tail piece and said air vents to close communication of the lower interior portion of said tail piece with respect to said air vents.

10. A vacuum breaking check valve device in combination with supply piping, said vacuum breaking check valve device comprising a tail piece; coupling means securing said tail piece relative to the discharge end of the supply piping; a tubular insert element secured by the said tail piece adjacent the discharge end of the supply piping, said tubular insert element having channel-defining wall portions adjacent its upper end which with said tail piece form an annular air flow passage, said tubular insert element having further lower wall portions formed to define a liquid flow passage from the supply piping toward said tail piece and terminating in a discharge opening of segmental circular formation the plane of which extends at an angle to the general direction of liquid flow from the supply piping toward said tail piece; air vents formed through the wall of said tail piece communicating with said annular air flow passage; a flap valve closure of segmental circular form for said discharge opening; and means for displaceably mounting said flap valve closure to close said discharge opening under gravity in the absence of liquid flow and for displacing said flap valve closure relative to said discharge opening under liquid flow through said liquid flow passage, said flap valve closure comprising yieldable material arranged to engage and seal said discharge opening when in closed position, said yieldable material being configurated to engage a wall of said tail piece intermediate the discharge opening of said tail piece and said air vents to close communication of the lower interior portion of said tail piece with respect to said air vents.

JESSE D. LANGDON.